United States Patent
Hong et al.

(10) Patent No.: US 7,634,189 B2
(45) Date of Patent: Dec. 15, 2009

(54) TWO-STEP AUTO-FOCUSING CAMERA

(75) Inventors: Chien-Long Hong, Taipei Hsien (TW); Ching-Hsing Huang, Taipei Hsien (TW); Jen-Hung Chung, Taipei Hsien (TW); Bing Zhou, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 433 days.

(21) Appl. No.: 11/561,329

(22) Filed: Nov. 17, 2006

(65) Prior Publication Data
US 2008/0118240 A1  May 22, 2008

(51) Int. Cl.
*G03B 3/10* (2006.01)
*H04N 5/65* (2006.01)
(52) U.S. Cl. ............................ 396/133; 359/824
(58) Field of Classification Search ................. 396/133; 359/824
See application file for complete search history.

(56) References Cited
U.S. PATENT DOCUMENTS

| | | | |
|---|---|---|---|
| 7,039,309 B2 | 5/2006 | Hsiao | |
| 7,295,388 B2 * | 11/2007 | Shyu et al. | 359/814 |
| 2002/0050907 A1 * | 5/2002 | Szu-Lu et al. | 336/192 |
| 2006/0034599 A1 * | 2/2006 | Osaka | 396/144 |
| 2006/0066746 A1 | 3/2006 | Lee et al. | |
| 2006/0109565 A1 * | 5/2006 | Watanabe et al. | 359/694 |
| 2007/0014566 A1 * | 1/2007 | Sobajima et al. | 396/330 |
| 2007/0116445 A1 * | 5/2007 | Kozakai et al. | 396/55 |

FOREIGN PATENT DOCUMENTS

| TW | 1306980 | | 3/2009 |
|---|---|---|---|
| WO | WO 2005054923 A1 | * | 6/2005 |

* cited by examiner

*Primary Examiner*—Melissa J Koval
*Assistant Examiner*—Leon W Rhodes
(74) *Attorney, Agent, or Firm*—Frank R. Niranjan

(57) ABSTRACT

A two-step auto-focusing camera includes a lens unit (12); a permanent magnet (124) being fixedly mounted around the lens unit to move with the lens unit; first and second coil seats (14, 15) with first and second coils (145, 155) wound thereon being mounted around the lens unit at two opposite sides of the magnet. When electric currents are supplied to the first and second coils, one of the coil seats generates an attraction force to the lens unit, and the other coil seat generates a repulsion force to the lens unit. A flange (143, 153) extends outwardly from an outer periphery of each coil seat at an end near the magnet to limit the magnet to move between the flanges of the first and second coil seats during movement of the lens unit.

16 Claims, 5 Drawing Sheets

TWO-STEP AUTO-FOCUSING CAMERA

BACKGROUND OF THE INVENTION

1. Field of the Invention

The present invention relates generally to a drive source of a camera, and more particularly to a drive source of a two-step auto-focusing camera.

2. Description of Related Art

Conventionally, an auto-focus structure is used for controlling the telescopic movement of a lens of the camera. Auto-focus structures are used to automatically produce high-quality images with minimum user effort, and as such are important part of a modern camera.

The auto focus structure of the camera focuses on an object by analysis of the image on an image sensor. The image sensor is either a charge coupled device (CCD) sensor or a complementary metal oxide semiconductor (CMOS) sensor, and is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest the lens stops at that position. In this case, the lens has to be continuously driven back and forth by an annular cam. The annular cam is provided with a lens driving structure and driven to rotate by a stepping motor. The moment the CPU detects the clearest image as the lens moves back and forth, a stop signal is sent to the lens. Therefore, the lens stops in the best focal position (static position). When the lens is moved back to the original position, the annular cam starts to rotate again. Once the lens moves back to its original position, the photo interrupter installed in the lens cylinder uses the shutter at the end of the lens cylinder, to detect the original position of the lens. The shutter will interrupt the light of the penetration-type photo interrupter. The lens stops at the moment when the photo interrupter detects the original position.

Consequently, the lens in a digital camera auto focus system has to be driven continuously to obtain the clearest positions. However, narrow gaps usually exist between components of the camera when the components are assembled to form the camera, which, in most of cases, results in imprecise and unstable movement of the lens, which may finally result in losing the clearest position to obtain the best image.

SUMMARY OF THE INVENTION

According to a preferred embodiment of the present invention, a two-step auto-focusing camera includes a lens unit; a permanent magnet being fixedly mounted around the lens unit to move with the lens unit; a first coil seat with a first coil wound thereon mounted around the lens unit and being arranged on a side of the permanent magnet; and a second coil seat with a second coil wound thereon mounted around the lens unit and being arranged on an opposite side of the permanent magnet. When electric currents are supplied to the first and second coils, the first and second coil seats create magnetic fields interacting with a magnetic field of the magnet to generate forces for moving the lens unit in the lens mount, the force generated by one of the first and second coil sets and the permanent magnet being attractive, the force generated by the other of the first and second coil sets and the magnet being repulsive. A flange extends outwardly from an outer periphery of each coil seat at an end near the permanent magnet, and the permanent magnet is limited to move between the flanges of the first and second coil seats during movement of the lens unit.

Other advantages and novel features of the present invention will be drawn from the following detailed description of a preferred embodiment of the present invention with attached drawings, in which:

BRIEF DESCRIPTION OF THE DRAWINGS

Many aspects of the present two-step auto-focusing camera can be better understood with reference to the following drawings. The components in the drawings are not necessarily drawn to scale, the emphasis instead being placed upon clearly illustrating the principles of the present two-step auto-focusing camera. Moreover, in the drawings, like reference numerals designate corresponding parts throughout the several views.

DETAILED DESCRIPTION OF THE INVENTION

Figure 1:
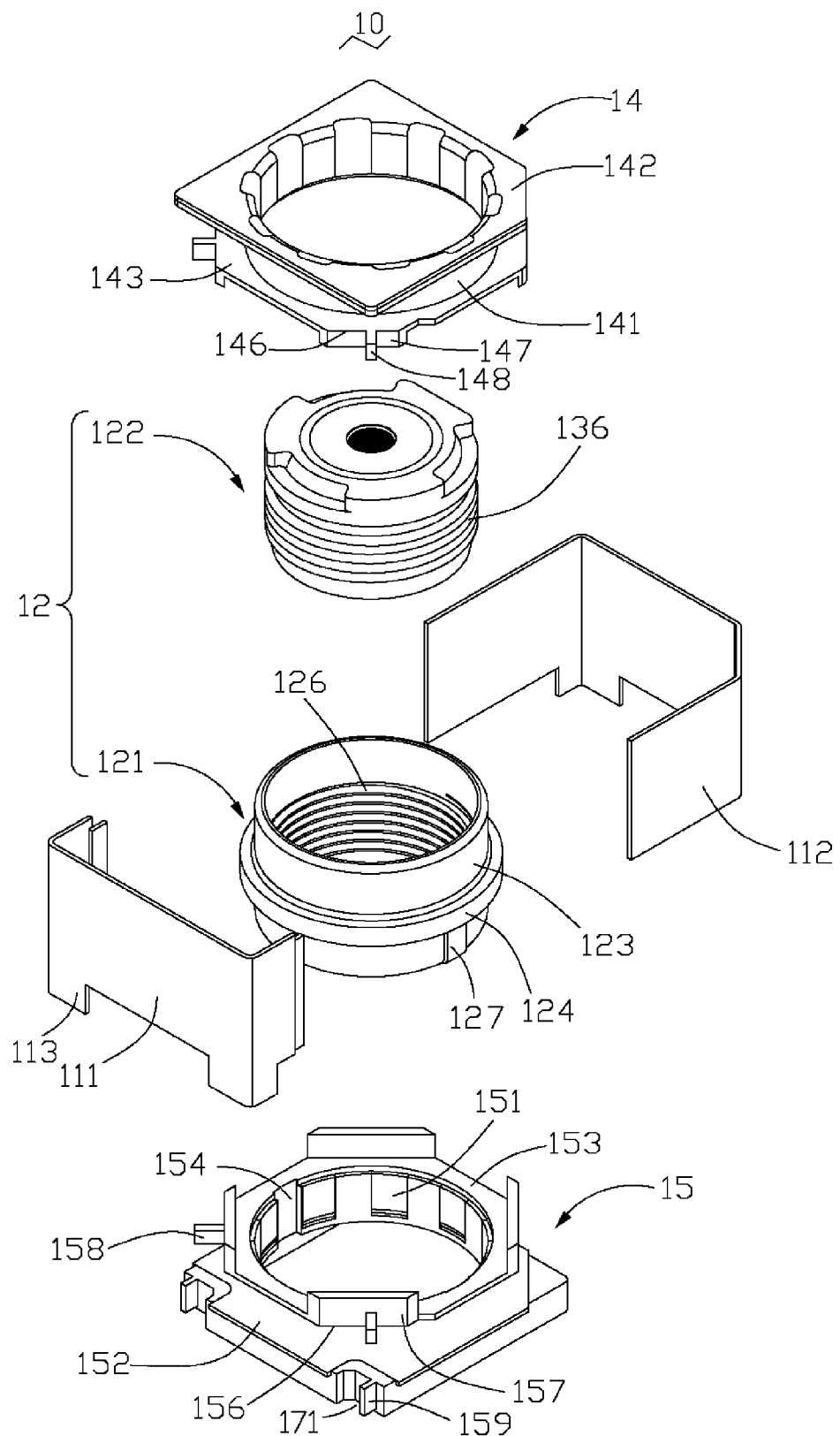
FIG. 1 is an isometric, exploded view of a two-step auto-focusing camera in accordance with a preferred embodiment of the present invention.
Figure 2:
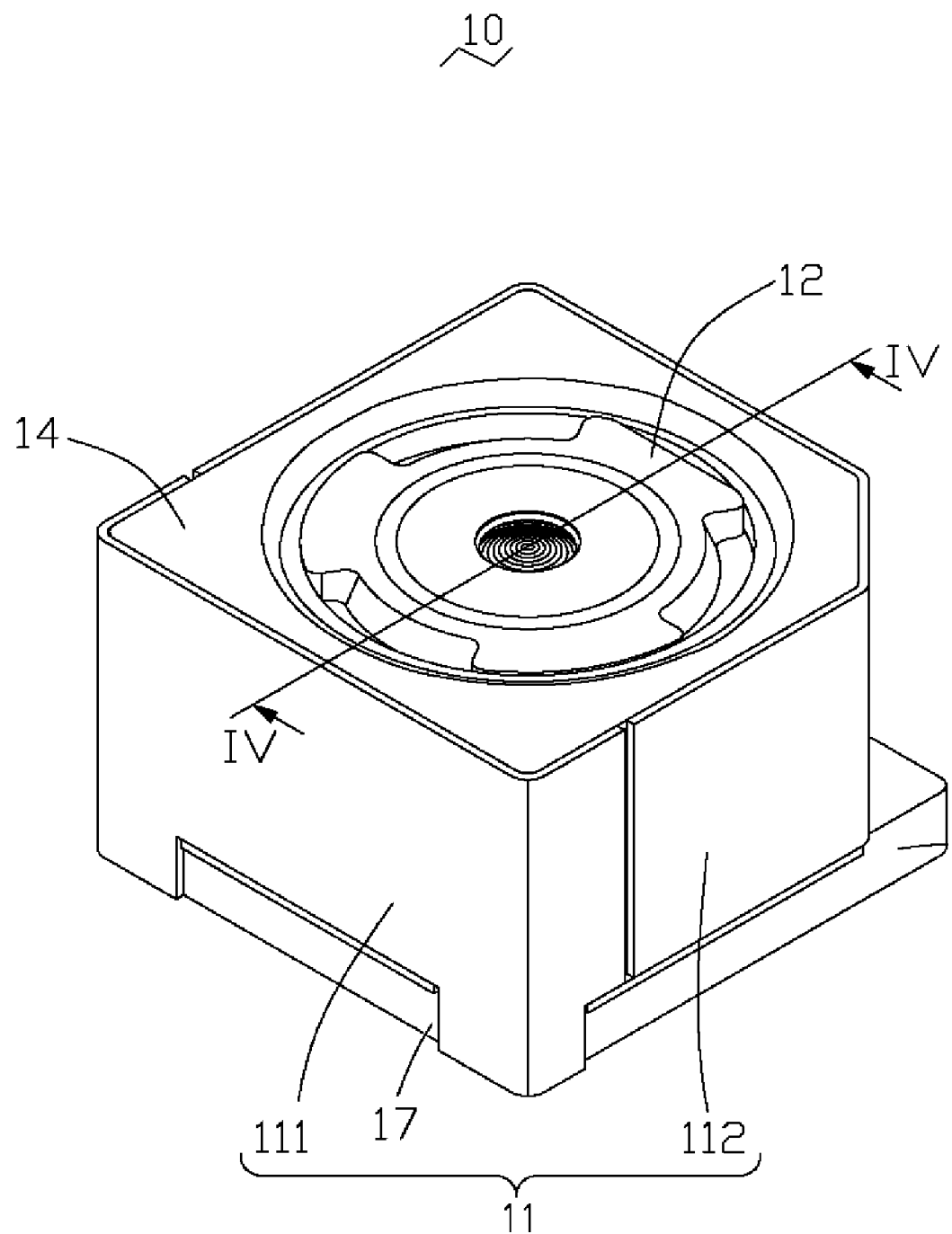
FIG. 2 is an assembled view of FIG. 1.
Figure 3:
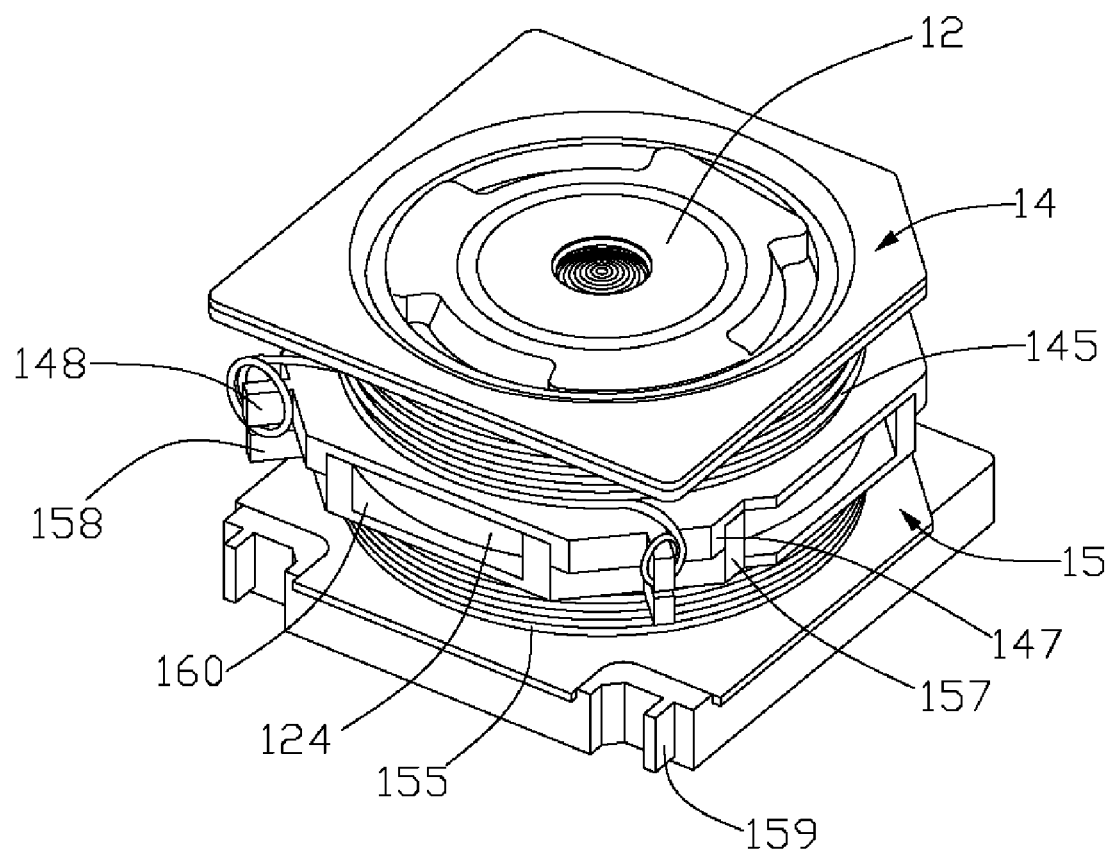
FIG. 3 is similar to FIG. 2, but showing the two-step auto-focusing camera without a sidewall.

Referring to FIGS. 1 through 3, a two-step auto-focusing camera 10 according to a preferred embodiment of the present invention includes a lens mount 11, a lens unit 12 received in the lens mount 11, and a motor (not labeled) for driving the lens unit 12 into telescopic movement.

The lens mount 11 includes a base 17, and a sidewall (not labeled) mounted on the base 17. The base 17 is square-shaped and defines an opening (not labeled) therein. A pair of notches 171 are respectively defined in two neighboring corners of the base 17. A pair of connecting pins 159 are formed in the notches 171 of the base 17 and extend outwardly therefrom. The sidewall is approximately a hollow regular prism with top and bottom ends thereof being opened, and is constructed by fixedly connecting two U-shaped parts 111, 112 together through soldering. A pair of ears 113 are formed at two neighboring corners of the sidewall corresponding to the corners of the base 17 forming the connecting pins 159 thereon and extend downwardly from a bottom end of the sidewall. Each ear 113 has a height approximately the same as that of the base 17, covering the connecting pins 159 of the base 17 therein when the sidewall is mounted on the base 17.

The lens unit 12 is approximately column-shaped, including a barrel 121 and a lens 122 being fixedly mounted in the barrel 121. The barrel 121 forms an inner thread 126 on an inner surface thereof, and the lens 122 forms an outer thread 136 on an outer surface thereof, which threadedly engages with the inner thread 126 of the barrel 121. A pair of blocks 127 (only one shown) extend radially and outwardly from an outer surface of the barrel 121 of the lens unit 12 near a bottom end thereof. When the lens unit 12 is received in the lens mount 11, an interspace (not labeled) is defined therebetween receiving the motor. The motor includes a permanent magnet 124 mounted around the barrel 121 and attached to a middle of the outer surface of the barrel 121, and upper and lower coil seats 14, 15 being arranged at upper and lower sides of the magnet 124, respectively.

The coil seats 14, 15 are made of magnetizable materials, such as iron. Each of the coil seats 14, 15 includes a cylinder 141, 151 having an inner diameter approximately the same as an outer diameter of the barrel 121 of the lens unit 12. Top and bottom flanges 142, 153, 143, 152 are respectively extend from outer peripheries of the cylinders 141, 151 at top and bottom ends thereof. The top and bottom flanges 142, 153, 143, 152 are square shaped. Furthermore, the top and bottom flanges 153, 143 define cutouts 146, 156 in each of the four corners thereof. A pair of grooves 154 are defined in an inner surface of the cylinder 151 of the lower coil seat 15 corresponding to the blocks 127 of the lens unit 12. A lower baffle 157 extends perpendicularly and upwardly from each cutout 156 of the top flange 153 of the lower coil seat 15, and an upper baffle 147 extends perpendicularly and downwardly from each cutout 146 of the bottom flange 143 of the upper coil seat 14. When the coil seats 14, 15 are assembled, each upper baffle 147 overlaps with and abuts against a corresponding lower baffle 157. In this embodiment, the upper baffles 147 are located outside of the lower baffles 157. The lower baffles 157 are located inside of the upper baffles 147 and are tangential to the barrel 121 of the lens unit 12. Thus movement of the lens unit 12 is limited by the lower baffles 157, and thus swing of the lens unit 12 is avoided. Alternatively, the lower baffles 157 can be located on the outside of the upper baffles 147, and thus the upper baffles 147 abut the lens unit 12 to avoid swing of the lens unit 12.

Each coil seat 14, 15 forms two mounting pins 148, 158 thereon. The mounting pins 148, 158 of each coil seat 14, 15 extend outwardly from two neighboring baffles 147, 157 thereof. The cylinders 141, 151 of the upper and lower coil seats 14, 15 have upper and lower coils 145, 155 wound thereon, respectively, and two ends of each coil 145, 155 are respectively wound on the mounting pins 148, 158 of the corresponding coil seat 14, 15. When assembled, the lens unit 12 with the magnet 124 is movably received in the lens mount 11. The upper and lower coil seats 14, 15 with upper and lower coils 145, 155 wound thereon are received in the interspace formed between the lens unit 12 and the lens mount 11, and are arranged on the upper and lower sides of the magnet 124, respectively. The two corners of the coil seats 14, 15 having the mounting pins 148, 158 are located corresponding to the position of the corners of the base 17 of the lens mount 11 where the connecting pins 159 are formed. The blocks 127 of the lower coil seat 15 engage into the grooves 154 of the lower coil seat 15 to prohibit rotation of the lens unit 12. The ends of the coils 145, 155 wound on the mounting pins 148, 158 of the coil seats 14, 15 are electrically connected with the connecting pins 159 of the base 17 of the lens mount 11 through soldering. When a power source is electrically connected to the connecting pins 159 of the base 17, a current is applied to each coil 145, 155 through the connecting pins 159. The coils 145, 155 are wound in different directions so that induced magnetic fields established by the two coils 145, 155 have polarities opposite to each other to drive the lens mount 11 into movement.

Figure 4:
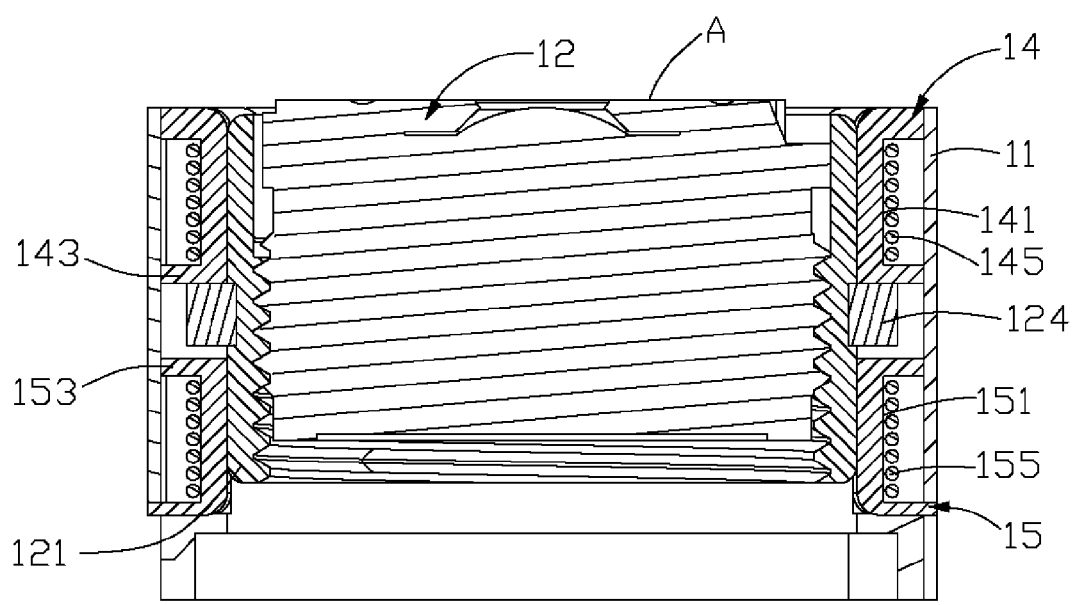
FIG. 4 shows a cross-sectional view of the two-step auto-focusing camera of FIG. 2 taken along line IV-IV thereof with a lens unit at its front focal point.
Figure 5:
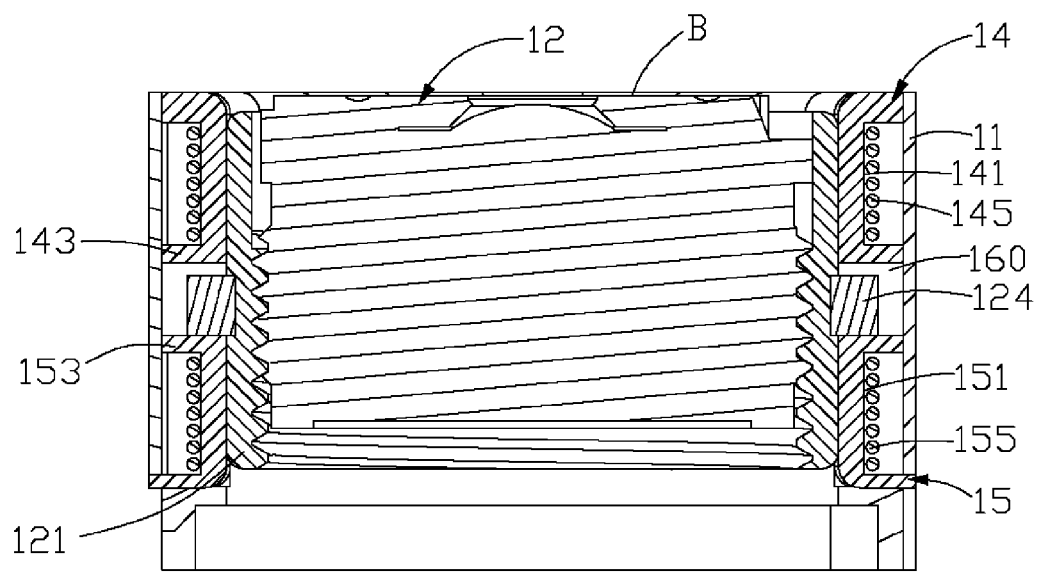
FIG. 5 is similar to FIG. 4, but showing the lens unit of the two-step auto-focusing camera at its rear focal point.

As shown in FIG. 4, assuming the upper side of the magnet 124 is N (north pole), and the lower side of the magnet 124 is S (south pole). The lens unit 12 is at its front focal point A initially. The bottom flange 143 of the upper coil seat 14 abuts the upper side of the magnet 124, whilst the top flange 153 of the lower coil seat 15 is separated by a space from the lower side of the magnet 124. The induced magnetic field of the upper coil 145 has polarities opposite to that of the magnet 124. The top end of the upper coil seat 14 is S, whilst the bottom end of the upper coil seat 14 is N. The induced magnetic field of the lower coil 155 has a similar polarity to that of the magnet 124. The bottom end of the lower coil seat 15 is S, whilst the top end of the lower coil seat 15 is N. Thus an attractive force is generated between the lower coil seat 15 and the magnet 124, whilst a repelling force is generated between the upper coil seat 14 and the magnet 124. The lens unit 12 with the magnet 124 moves downwardly to its rear focal point B (as shown in FIG. 5) from the bottom flange 143 of the upper coil seat 14 to the top flange 153 of the lower coil seat 15. Since the coil seats 14, 15 are made of magnetic material which have residual magnetic force therein after the current is stopped from supplying to the coils 145, 155, no current is needed for holding the lens unit 12 at the rear focal point B after the lens unit 12 is moved to the rear focal point B.

Conversely, when the lens unit 12 is at the rear focal point B and moves to the front focal point A, the directions of the currents applied to the coils 145, 155 are switched. The induced magnetic field of the upper coil 145 has polarities similar to that of the magnet 124. The top end of the upper coil seat 14 is N, whilst the bottom end of the upper coil seat 14 is S. The induced magnetic field of the lower coil 155 has a polarity substantially opposite to that of the magnet 124. The bottom end of the lower coil seat 15 is N, whilst the top end of the lower coil seat 15 is S. Attractive force is generated between the upper coil seat 14 and the magnet 124, and repelling force is generated between the lower coil seat 15 and the magnet 124. The lens unit 12 with the magnet 124 moves upwardly to its front focal point A from the top flange 153 of the lower coil seat 15 to the bottom flange 143 of the upper coil seat 14 under the attractive force of the upper coil seat 14 and the repelling force of the lower coil seat 15. Also the upper coil seat 14 provides an attractive force to the magnet 124 to keep the lens unit 12 at its front focal point A after the lens unit 12 reaches the front focal point A and the current is stopped from supplying to the coils 145, 155. During movement of the lens unit 12, the baffles 147, 157 are arranged around the lens unit 12 and are approximately tangential to the lens unit 12. The flanges 143, 153 formed on the upper and lower coil seats 14, 15 are capable of limiting the telescopic movement of the lens unit 12. The lens unit 12 is thus limited to switch between the two flanges 143, 153 to obtain the clearest positions which are the front and rear focal points. Thus, the lens unit 12 of the camera 10 can have precise and stable movement for obtaining the clearest position to catch the best image.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A two-step auto-focusing camera comprising:
    a lens unit;
    a permanent magnet being fixedly mounted around the lens unit to move with the lens unit;
    a first coil seat with a first coil wound thereon mounted around the lens unit and being arranged on a side of the permanent magnet;
    a second coil seat with a second coil wound thereon mounted around the lens unit and being arranged on an opposite side of the permanent magnet, and when electric currents are supplied to the first and second coils, the first and second coil seats have magnetic fields interacting with a magnetic field of the permanent magnet to generate forces to move the lens unit, the force generated by one of the first and second coil seats and the permanent magnet being an attractive force, the force generated by the other of the first and second coil seats and the magnet being a repulsive force; and a flange extending outwardly from an outer periphery of each coil seat at an end near the permanent magnet, with the permanent magnet being limited to move between the flanges of the first and second coil seats during movement of the lens unit, the permanent magnet abutting against one of the flanges of the first and second coil seats when the lens unit reaches its focus position.

2. The two-step auto-focusing camera of claim 1, wherein at least one spacing member extends from the flange of the one of the first and second coil seats to and abuts the other one of the first and second coil seats.

3. The two-step auto-focusing camera of claim 2, wherein the flanges have square-shaped profiles and respectively define four cutouts at four corners thereof, the at least one spacing member comprising four spacing members extending from the four cutouts of either of the flanges, respectively.

4. The two-step auto-focusing camera of claim 3, wherein each flange has four spacing members extending therefrom and overlapping with corresponding spacing members of the other flange.

5. The two-step auto-focusing camera of claim 4, wherein the spacing members of each flange adjacent to the lens unit are substantially tangential to the lens unit.

6. The two-step auto-focusing camera of claim 2, wherein the at least one spacing member forms mounting pins thereon for guiding ends of the coil to be electrically connected to a power source to supply the electric currents to the coils.

7. The two-step auto-focusing camera of claim 6, further comprising a lens mount having a base, a sidewall mounted on the base to define a space therebetween for receiving the lens unit therein, a pair of connecting pins being formed on the base and connected with the power source and the ends of the coils by soldering.

8. The two-step auto-focusing camera of claim 7, wherein the sidewall of the lens mount comprises two parts being fixedly connected together by soldering.

9. The two-step auto-focusing camera of claim 1, wherein the lens unit comprises a barrel and a lens fixedly mounted in the barrel, an inner thread being formed on an inner surface of the barrel, and an outer thread threadedly engages with the inner thread being formed on an outer surface of the lens.

10. The two-step auto-focusing camera of claim 9, wherein at least one groove is defined in one of the barrel and the coil seats, and at least one block being formed on the other one of the barrel and the coil seats is engaged in the at least one groove.

11. A two-step auto-focusing camera comprising:
a lens mount;
a lens unit being received in the lens mount;
a permanent magnet being fixedly mounted around a middle of the lens unit;
first and second coil seats with first and second coils respectively wound thereon being received in the lens mount and being mounted around the magnet at two opposite sides thereof;
first and second flanges being respectively formed on the first and second coil seats at a side adjacent to the magnet; and
a plurality of spacing members being arranged between and abutting against the flanges, the spacing members forming a plurality of mounting pins thereon for guiding ends of the coils to be electrically connected to a power source to supply electric currents to the coils and thus generating attractive and repulsive forces to drive the lens unit to move, the permanent magnet being limited to move between the flanges of the first and second coil seats during movement of the lens unit, the permanent magnet abutting against one of the flanges of the first and second coil seats when the lens unit reaches its focus position.

12. The two-step auto-focusing camera of claim 11, wherein the flanges have square-shaped profiles and respectively define four cutouts at four corners thereof, the spacing members comprising four spacing members respectively extending from the four cutouts of each of the first and second flanges.

13. The two-step auto-focusing camera of claim 12, wherein each flange has four spacing members extending therefrom and overlapping with corresponding spacing members of the other flange.

14. The two-step auto-focusing camera of claim 13, wherein the spacing members of the flange adjacent to the lens unit are substantially tangential to the lens unit.

15. The two-step auto-focusing camera of claim 13, wherein each of the coil seats comprises a cylinder for a corresponding one of the first and second coils wound thereon, the first and second flanges each extending outwardly from an end of the cylinder adjacent to the magnet, each of the coil seats further comprising a flange extending outwardly from an opposite end of the cylinder away from the magnet.

16. The two-step auto-focusing camera of claim 13, further comprising a lens mount having a base, a sidewall mounted on the base to define a space therebetween for receiving the lens unit therein, a plurality of connecting pins being formed on the base and electrically connected with a power source, the mounting pins of the first and second coil seats located corresponding to positions of the connecting pins of the base, ends of the first and second coils wound on the mounting pins of the first and second coil seats and being electrically connected with the connecting pins of the base.

* * * * *

UNITED STATES PATENT AND TRADEMARK OFFICE
CERTIFICATE OF CORRECTION

PATENT NO. : 7,634,189 B2
APPLICATION NO. : 11/561329
DATED : December 15, 2009
INVENTOR(S) : Hong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Ninth Day of November, 2010

David J. Kappos
*Director of the United States Patent and Trademark Office*